(12) United States Patent
Gross et al.

(10) Patent No.: US 7,890,562 B2
(45) Date of Patent: Feb. 15, 2011

(54) SINE WAVE GENERATOR WITH DUAL PORT LOOK-UP TABLE

(75) Inventors: David M. Gross, Somerville, MA (US); William Scott McDonald, Littleton, MA (US)

(73) Assignee: Teradyne, Inc., North Reading, MA (US)

( * ) Notice: Subject to any disclaimer, the term of this patent is extended or adjusted under 35 U.S.C. 154(b) by 1142 days.

(21) Appl. No.: 11/529,837

(22) Filed: Sep. 29, 2006

(65) Prior Publication Data

US 2008/0109503 A1 May 8, 2008

(51) Int. Cl.
  *G06F 1/02* (2006.01)
(52) U.S. Cl. ...................................... 708/276
(58) Field of Classification Search ................ None
  See application file for complete search history.

(56) References Cited

U.S. PATENT DOCUMENTS

| | | | |
|---|---|---|---|
| 5,430,764 A | 7/1995 | Chren | |
| 5,467,294 A * | 11/1995 | Hu et al. ..................... | 708/276 |
| 6,489,911 B1 | 12/2002 | O'Dwyer | |
| 7,026,846 B1 * | 4/2006 | Huntley et al. ............... | 327/105 |
| 7,436,166 B1 * | 10/2008 | Solbrig ..................... | 324/76.55 |

OTHER PUBLICATIONS

International Search Report and Written Opinion for International Application Serial No. PCT/US2007/020318, 2008.

* cited by examiner

*Primary Examiner*—David H Malzahn
(74) *Attorney, Agent, or Firm*—Wolf, Greenfield & Sacks, P.C.

(57) ABSTRACT

An automatic test system that includes low cost and accurate circuitry for generating sinusoidal signals. Each sinusoidal signal generator includes a look-up table that can, for each phase on sine wave, output two digital values representing an in-phase and a quadrature-phase value of the sine wave. Simple circuitry can be used to address the look-up table to output in-phase and quadrature-phase values. The in-phase and quadrature-phase values can be applied to down-stream circuitry, such as error correction circuitry, that uses an in-phase and a quadrature-phase value to process the sine wave without the need for a relatively complex phase shifter in the down-stream circuitry. A dual-port memory may be used to implement the look-up table so that both an in-phase and a quadrature-phase value may be obtained from a single block of memory that stores a representation of a sine wave.

21 Claims, 9 Drawing Sheets

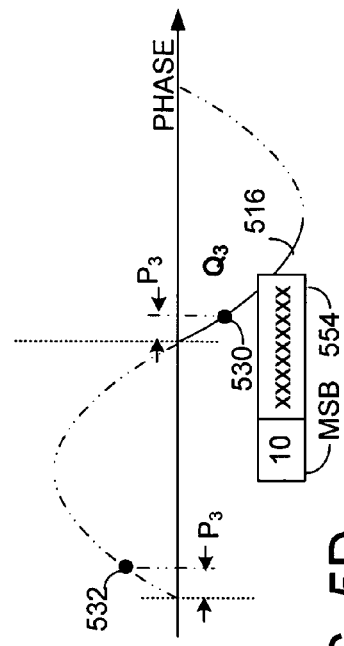
FIG. 5A
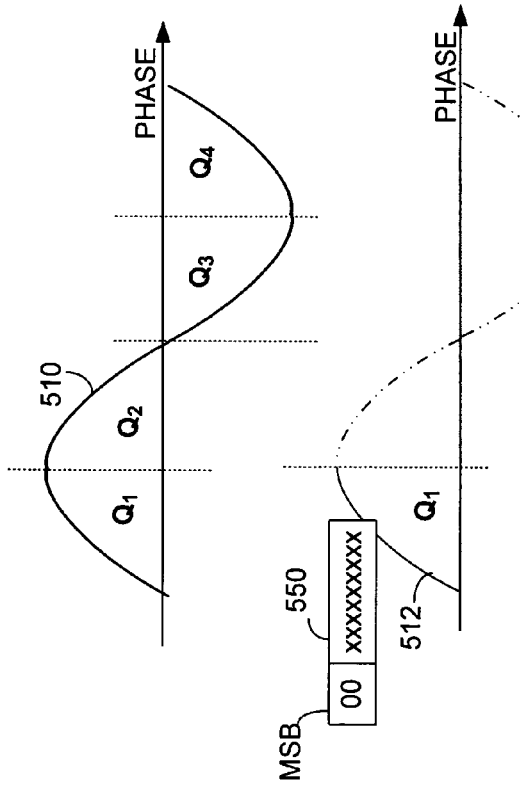
FIG. 5B
FIG. 5C
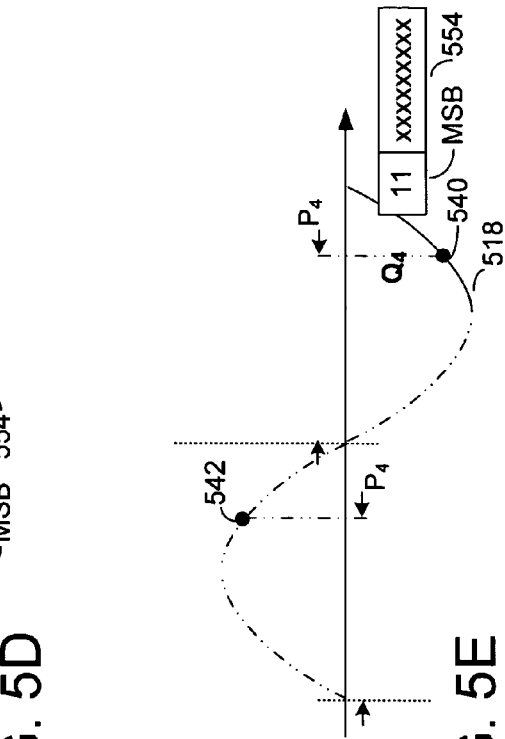
FIG. 5D
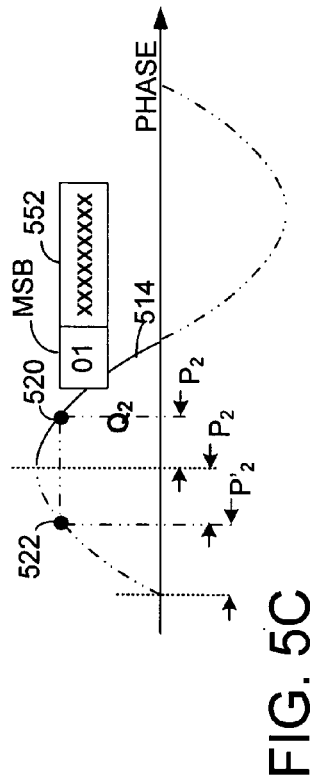
FIG. 5E

SINE WAVE GENERATOR WITH DUAL PORT LOOK-UP TABLE

BACKGROUND OF INVENTION

1. Field of Invention

The invention relates generally to automatic test equipment and more particularly to generation of signals for testing semiconductor devices.

2. Discussion of Related Art

Semiconductor devices are tested, often multiple times, during their manufacture. A piece of automatic test equipment, referred to as "ATE" or a "tester," is used to generate test signals that stimulate a device under test (DUT) and to measure a response from the DUT. The tester determines whether the DUT is operating properly by comparing the response evoked by a carefully controlled pattern of test signals with an expected response.

To fully test devices, the tester should generate and measure signals like those in the intended operating environment of those devices. Because numerous types of semiconductor devices need to be tested, automatic test equipment is designed to be programmable so that it may generate or measure the signals needed to test any desired type of semiconductor device.

Further, the test signals must be generated accurately. Inaccurate test signals lead to inaccurate test results, which in turn can lead to semiconductor devices that actually perform as expected being classified as defective devices and discarded. Inaccuracy in test signals may also create uncertainty in test results such that, for some subset of devices tested, it is impossible to determine whether the device operates as expected. When uncertainty precludes a determination of whether a device is operating correctly, the device is classified as defective and discarded. Therefore, inaccurate signal generation in a tester can have a high cost associated with it.

Sinusoidal signals are one type of signal frequently generated within a tester. For example, a sinusoidal signal may be applied to the device under test so that the response by the device to the sinusoidal signal may be measured. In other instances, the sinusoidal signal is used for timing signals that are applied to the device under test.

Regardless of how the sinusoidal signal is used as a test signal, inaccuracies in generating the signal can impact the test results. If the sinusoidal signal is applied directly to the device under test, the measured response may not be as expected—not because the device is defective, but because the test signal was not as expected. If the sinusoidal signal is used for timing other events, the expected response may not be detected—not because the device failed to produce the response, but because the tester measured the response at the wrong time. Accordingly, accurate generation of programmable sinusoidal signals is important in many aspects of an automatic test system.

Some testers use direct digital synthesis (DDS) to generate sinusoidal signals of programmable frequency. A traditional approach for generating a sinusoidal signal using DDS is to store in a look-up table values representing a cycle of a sinusoidal signal. A phase accumulator periodically generates phase values that act as addresses to the look-up table. The value in the accumulator increases each period by a programmed phase increment. When the values from the phase accumulator are used to address the look-up table, the output of the look-up table is a sequence of amplitude values corresponding to points on a sine wave that are spaced in phase by the phase increment. To produce a periodic signal, the phase accumulator uses modular arithmetic when it increases the accumulated phase by the phase increment. When adding the phase increment to the accumulated phase would result in a phase value beyond the end of one cycle of the sine wave, the phase accumulator converts that phase value to a phase value an equivalent distance from the start of the cycle that is stored in the look-up table.

The magnitude of that programmed phase increment controls the length of time it takes for the output of the look-up table to trace out one cycle of the sine wave. This time is inversely proportional to the frequency of the sine wave generated so that specifying the phase increment provides a mechanism to program the frequency of the sine wave.

The values in the series output from the look-up table may be converted to an analog signal, which is a sine wave of the programmed frequency.

SUMMARY OF INVENTION

A low cost DDS signal generator is constructed using a multi-port memory to implement a look-up table storing a representation of a sinusoidal signal to be generated. The dual port memory outputs values to processing circuitry that requires an in-phase and quadrature phase component. By appropriately computing the addresses for each port, one port of the memory can provide the in-phase component and another port can provide the quadrature-phase component.

In one aspect, the invention relates to an apparatus for generating a cyclical signal. The apparatus includes an accumulator having an output representing a phase. A memory with a first address input and a second address input and a first output and a second output stores values representing at least a portion of the cyclical signal. The first address input is coupled to the output of the accumulator and the second address input coupled to the output of the accumulator through a phase shifter. A circuit having a first input and a second input is coupled to the first and second outputs of the memory. An output of the circuit is based on the first input and the second input and is coupled to a digital to analog converter.

In another aspect, the invention relates to a method of generating a cyclical signal that includes generating a series of addresses at periodic intervals. A shifted series of addresses is produced from the series of addresses. A first series of values is read through a first port of a memory from addresses in the series of addresses. A second series of values is read through a second port of the memory from addresses in the sifted series of addresses. A third series of values is obtained based on the first series of values and the second series of values. A fourth series of values is computed by combing the third series of values with at least the first series of values and is applied to a digital to analog converter.

In yet a further aspect, the invention relates to an automatic test system with a direct digital synthesis circuit adapted to generate a cyclical signal. The direct digital synthesis circuit includes an accumulator and a memory storing values representing at least a portion of the cyclical signal. The memory has a first address input and a second address input and a first output and a second output. The first address input is coupled to the output of the accumulator. The second address input is coupled to the output of the accumulator through a shifter. A circuit, having inputs coupled to the outputs of the memory, has an output coupled to a digital to analog converter.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIGS. 5A . . . 5E are sketches illustrating data stored in a look-up table according to an embodiment of the invention;

DETAILED DESCRIPTION

The inventors have appreciated that a semiconductor test system may be improved with an accurate, programmable sinusoidal signal generator that is readily implemented at low cost as part of a test system. According to an embodiment of the invention, a sinusoidal signal generator is implemented using a look-up table from which both in-phase and quadrature-phase components of a representation of the sinusoidal signal to be generated are obtained. A simple implementation of such a look-up table may be formed using a dual-port memory that is addressed with phase values. A phase shifter at the address input at the second port can generate, from the address value applied to the first port, an address appropriate for accessing through the second port a quadrature-phase value corresponding to an in-phase value accessed through the first port.

Addresses to read two values per period from a memory may be computed with less circuitry and less complex circuitry than required to shift the phase of a signal represented by values that have been read from memory. Though both approaches to generating an in-phase and a quadrature-phase signal may use a phase shifter, the circuitry required to shift the phase of an address to the look-up table that already represents a phase may be more simply implemented than circuitry required to shift the phase of a signal represented by a series of values read from the memory. The circuitry can therefore be smaller and can be implemented at a lower cost.

Figure 1:
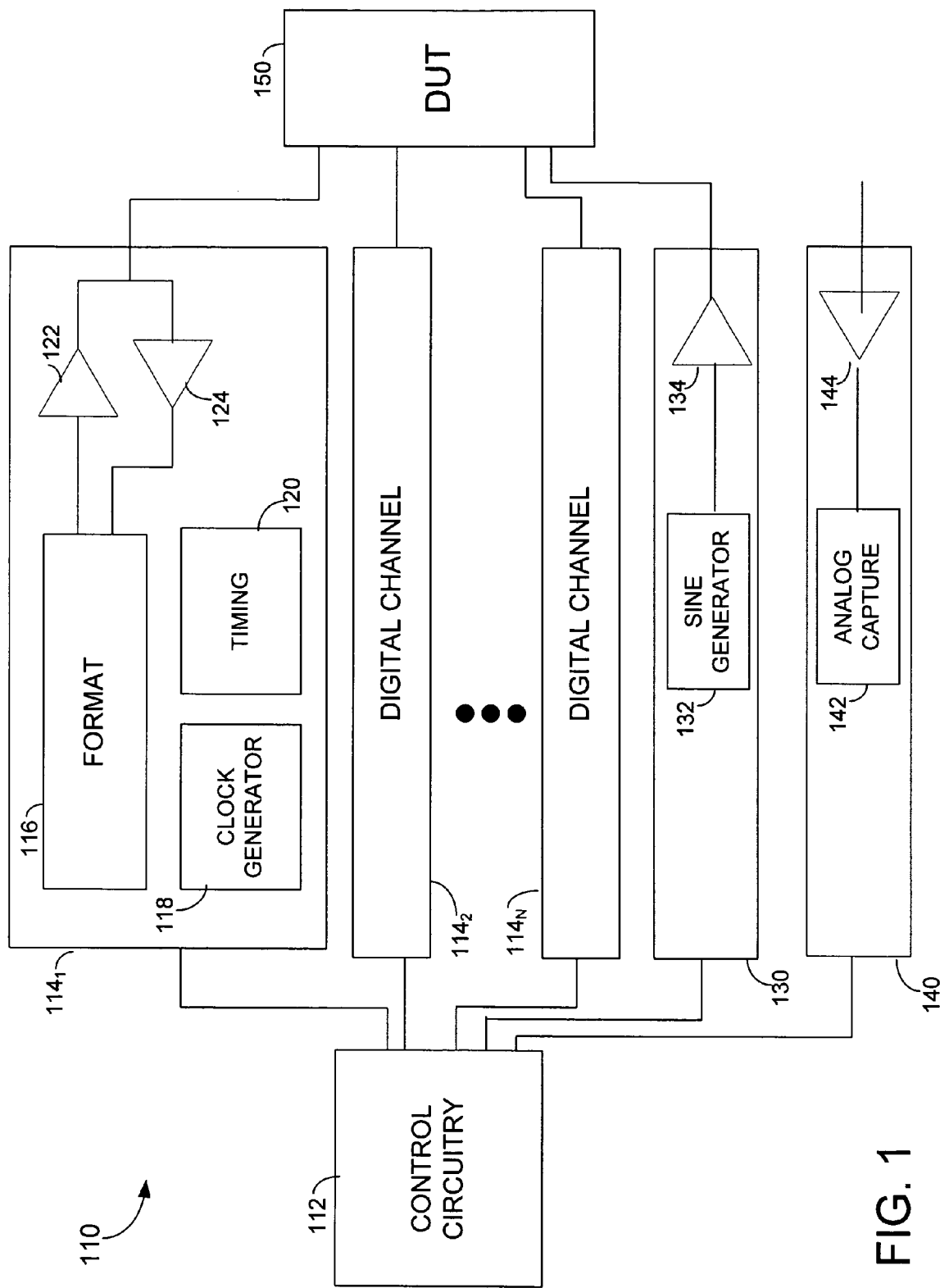
FIG. 1 is a block diagram of an automatic test system according to an embodiment of the invention.

Such a sinusoidal signal generator may be desirable in an automatic test system, which may include multiple sinusoidal signal generators. FIG. 1 illustrates an automatic test system that may employ one or more sinusoidal signal generators according to an embodiment of the invention. Test system 110 includes control circuitry 112. Control circuitry 112 may include a computer work station or other device serving as a user interface. Through such a user interface, a user may program the system 110 to generate test signals that act as stimuli for device under test (DUT) 150 and to capture responses from DUT 150. Programming provided through control circuitry 112 may also specify the expected response to each stimulus signal or pattern of stimulus signals.

Control circuitry 112 may include a computer work station attached to a tester body operating in conjunction with control circuitry inside a tester body. The work station may be programmed to both control test system 110 to generate test signals and to analyze signals measured by test system 110. However, the implementation of control circuitry 112 is not critical to the invention and control circuitry 112 may be implemented as in a conventional test system or in any other suitable way.

Control circuitry 112 may control multiple circuits that generate signals applied to DUT 150 and/or measure signals output by DUT 150. In the illustrated embodiment, test system 110 may generate and/or measure both digital and analog signals.

Digital channel circuits $114_1$, $114_2$ ... $114_N$ may be programmed to generate digital test signals according to a programmed stimulus pattern. Digital channel circuitry $114_1$, $114_2$ ... $114_N$ may also be programmed to measure digital signals output by DUT 150 and determine whether DUT 150 responds as expected to an applied stimulus. Each digital channel circuit $114_1$ ... $114_N$ generates or measures a digital test signal for one test point on DUT 150 at a time. Because DUT 150 may contain numerous test points, test system 110 may include multiple digital channel circuits.

Taking digital channel circuit $114_1$ as illustrative, each of the digital channel circuits includes subcircuits to generate or measure a digital test signal according to a programmed pattern. Operation of digital channel circuit $114_1$ is timed by one or more clocks generated by clock generator 118. The frequency of clocks generated by clock generator 118 may be programmed so that digital channel circuit $114_1$ may generate test signals of desired frequencies at desired times.

Timing generator 120 uses the clocks generated by clock generator 118 to generate one or more timing signals that control operation of other components within digital channel circuit $114_1$. In the embodiment shown in FIG. 1, digital channel circuit $114_1$ includes a format circuit 116. Format circuit 116 uses timing signals generated by timing generator 120 to format a waveform that is applied through driver 122 to a test point on DUT 150. For example, format circuit 116 may generate signals that transition state, such as from a logical high state to a logical low state, at times controlled by timing signals from timing generator 120.

For measuring an output from DUT 150, signals from timing generator 120 may control the time at which comparator 124 samples the output of a test point on DUT 150. For example, format circuit 116 may read the output of comparator 124 and compare it to a programmed expected value to determine whether DUT 150 output a value as expected at a time controlled by timing signals generated by timing generator 120.

The components of digital channel circuit $114_1$ may generally be implemented using components as in a conventional test system or any other suitable components. However, in the embodiment illustrated, clock generator 118 includes one or more sinusoidal signal generators according to an embodiment of the invention.

Such a sinusoidal signal generator may be used to generate a sinusoidal signal of a programmed frequency. The sinusoidal signal may be used to derive a clock of the same frequency. For example, the sinusoidal signal may be amplified in a very high gain amplifier to produce a signal resembling a traditional square wave frequently used as a clocking signal in electronic equipment. For a signal generated in this fashion to result in an accurate clock signal, the sinusoidal signal preferably has low distortion because distortion of the sinusoidal signal may translate into inaccuracies in the timing signals generated based on the clock.

Automatic test system 110 also includes one or more analog channels for generating or measuring analog signals. In the embodiment of FIG. 1, test system 110 is shown with an analog channel 130 to generate an analog signal. In the embodiment illustrated in FIG. 1, analog channel 130 generates an analog test signal, which is illustrated to be a sine wave of programmable frequency. Accordingly, analog channel 130 is shown to include a sine wave generator 132 that is coupled to a driver 134. Driver 134 is in turn coupled to a test point on DUT 150 and supplies as a test signal the sine wave generated by sine wave generator 132.

Analog channel 140 can capture an analog signal for analysis. In the illustrated embodiment, analog channel 140 includes a receiver 144, which acts as a signal buffer and conditioner. Analog channel 140 also includes an analog capture circuit 142. Analog capture circuit 142 can sample a signal buffered by receiver 144 for processing within control circuitry 112 or other components within automat test system 110. The timing of those samples may be controlled by a clock derived from a sinusoidal signal generator.

Though switching circuitry is not expressly shown, such circuitry may be included to couple each of the analog and digital channels to a test point on DUT 150 or other signals, automatic test system 110 may include such switching circuitry. Switching circuitry coupled to analog channel 140 may allow analog channel 140 to measure a signal generated by DUT 150 as part of a test. Additionally, such switching circuitry could allow analog channel 140 to be connected to other analog or digital channels of test system 110 to measure signals generated by those channels for calibration or other purposes.

FIG. 1 shows two analog channels for simplicity of illustration. A test system according to an embodiment of the invention may have any number of analog channels that generate and/or measure analog test signals. Analog channels that perform different or additional functions may be incorporated into tester 110. Such different or additional channels may also incorporate programmable sine wave generators to generate sinusoidal signals for application to DUT 150 or to otherwise control some aspect of a test of DUT 150.

Figure 2A:
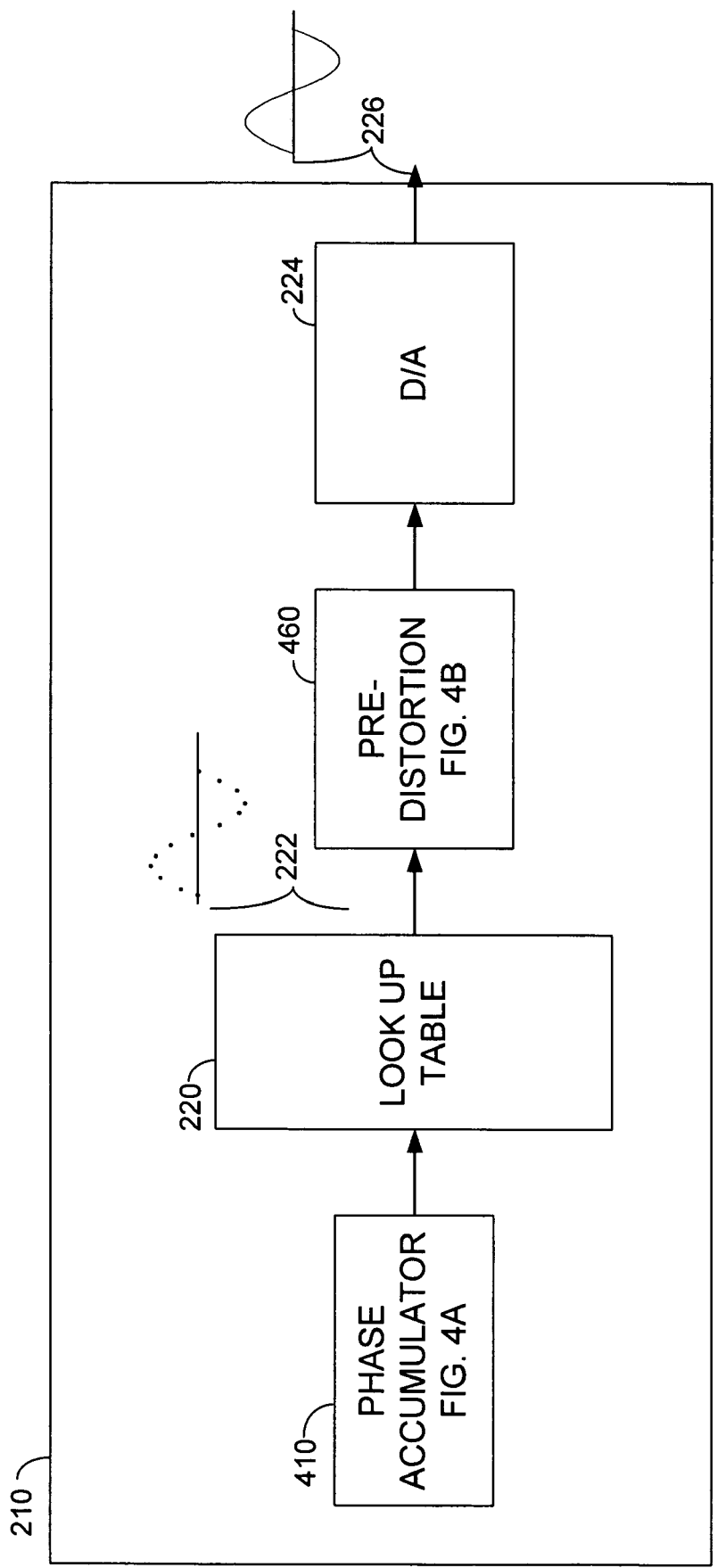
FIG. 2A is a block diagram of a sinusoidal signal generator.

As can be seen from the sketch of automatic test system 110 in FIG. 1, an automatic test system may include multiple circuits that generate sine waves of programmable frequency. FIG. 2A illustrates sine wave generator 210 that may be used to generate some or all of the sinusoidal signals within tester 110. Sine wave generator 210 may be used to generate a sine wave of programmable frequency and may be used in either a digital channel, such as digital channel 114$_1$, or an analog channel, such as analog channels 130 or 140, or in any other location within an automatic test system.

Sine wave generator 210 includes a look-up table 220. Look-up table 220 may be implemented in one or more memories that store digital values representing amplitude points on a sine wave. The values are stored in look-up table 220 at addresses correlated to the phase of the sine wave at which the value occurs. Accordingly, when look-up table 220 is addressed with a value representing a phase on the sine wave, it outputs the amplitude value of the sine wave at that phase.

Addresses to look-up table 220 are generated by phase accumulator 410. As in a conventional DDS circuit, phase accumulator 410 outputs a series of addresses that successively increase by a phase increment. The increase is computed using modular arithmetic so that, if increasing the value in phase accumulator 410 would result in a phase beyond the end of one cycle of the sine wave, phase accumulator 410 computes a phase that is the same amount beyond the start of a cycle of the sine wave that the incremented phase exceeds the end of that cycle.

In response to this series of addresses, look-up table 220 generates an output 222 that is a sequence of digital values that vary in a sinusoidal pattern. The frequency of variation of that pattern depends on the phase increment used by phase accumulator 410. Thus, by programming the phase increment, the frequency of the sine wave output from look-up table 220 may be programmed.

The digital values at output 222 are coupled to digital to analog converter (D/A) 224. D/A 224 converts the series of digital values into an analog signal at its output 226. In an ideal digital to analog converter, the analog signal at output 226 would be a perfect sine wave if the series of digital values at its input represented a perfect sine wave. However, practical implementations of digital to analog converters are not perfectly linear in their operation. Accordingly, each digital to analog converter introduces some amount of nonlinearity error. When generating a sine wave, nonlinearity error introduced by a digital to analog converter appears as distortion in the analog signal at output 226.

To reduce the amount of nonlinearity error introduced by D/A 224, and therefore the amount of distortion, predistortion circuit 460 may be connected between look-up table 220 and D/A 224. Predistortion circuit 460 includes look-up tables that may be programmed with values representative of the nonlinearity error introduced by D/A 224. These values may be subtracted from the values in the stream of values at output 222 to offset errors introduced by D/A 224. When the output of predistortion circuit 460 is applied to D/A 224, the distortion subtracted by predistortion circuit 460 offsets the distortion added by conversion in D/A 224. Accordingly, output 226 more accurately resembles a pure sine wave with less distortion.

In the embodiment of FIG. 2A, predistortion circuit 460 compensates only for nonlinearity errors introduced in D/A 224. In other embodiments, predistortion circuit 460 may also compensate for other sources of nonlinearity error, including errors introduced because the values stored in look-up table 220 do not describe a perfect sine wave.

Figure 4B:
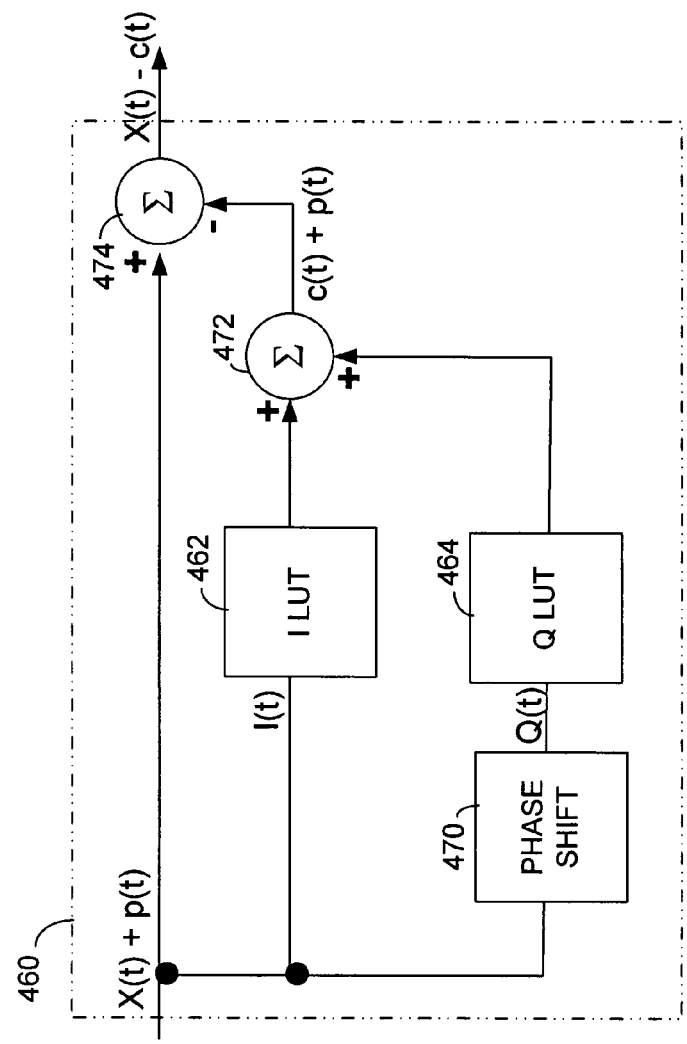
FIG. 4B is a block diagram of a predistortion circuit that may be used in the sinusoidal signal generator of FIG. 2A.
Figure 4A:
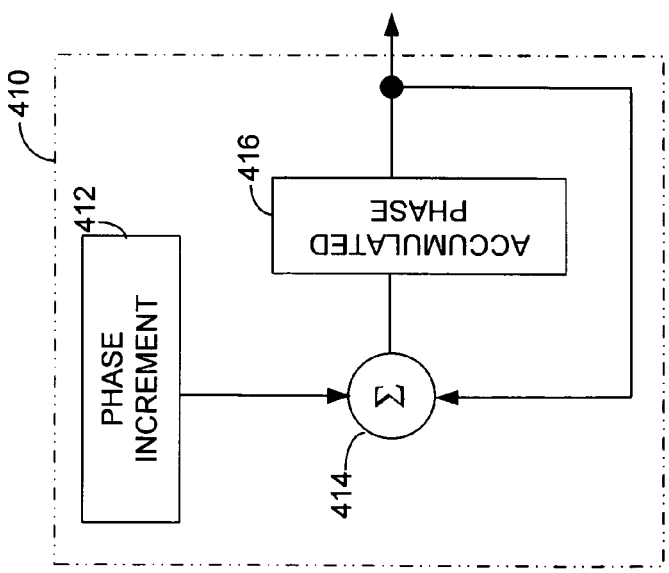
FIG. 4A is a block diagram of a phase accumulator that may be used in a sinusoidal signal generator according to an embodiment of the invention.
Figure 4C:
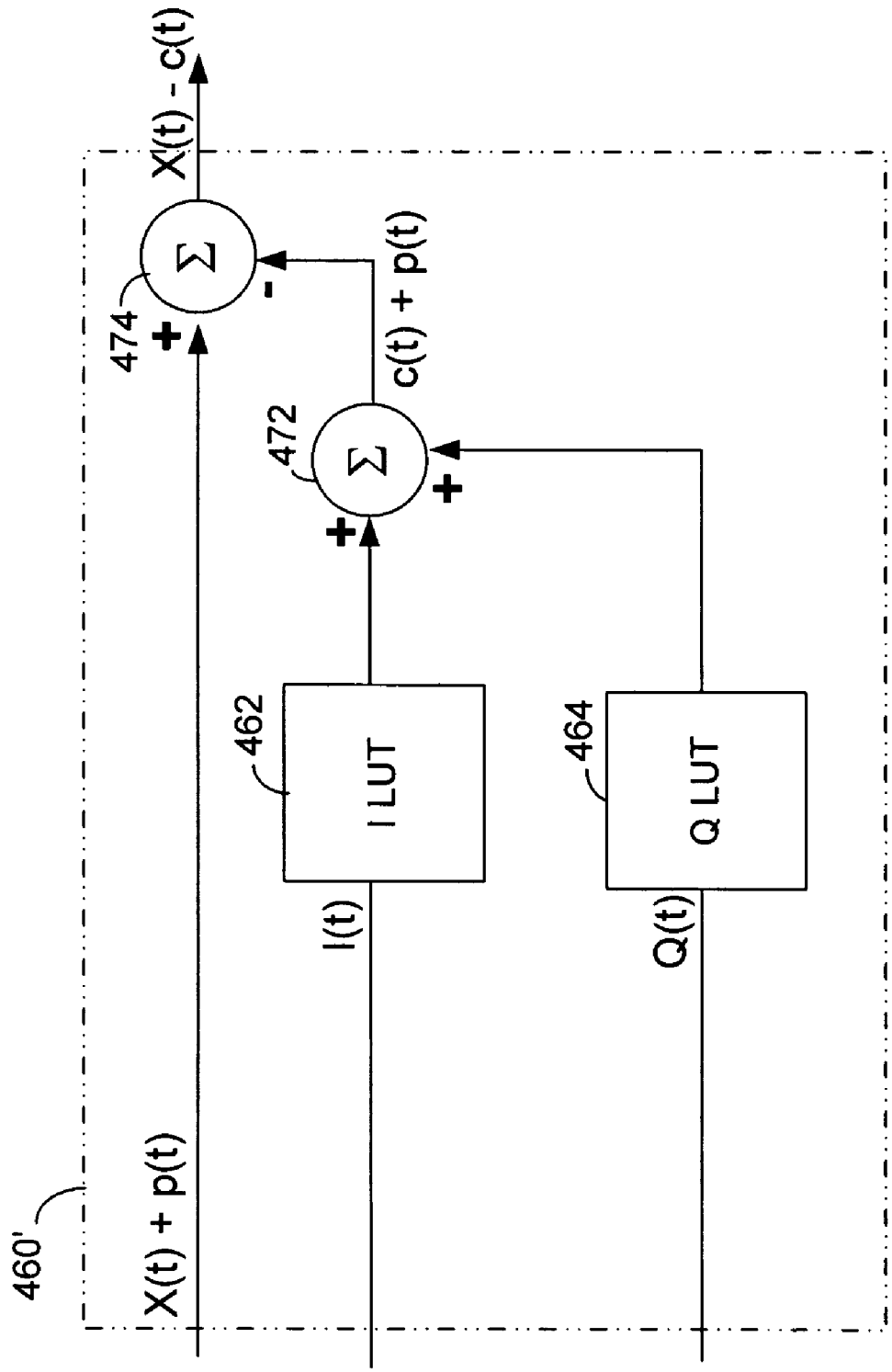
FIG. 4C is a block diagram of a predistortion circuit that may be used in the sinusoidal signal generator of FIG. 2B or 2C.

FIGS. 4A, 4B and 4C illustrate embodiments of circuitry that may be used in sinusoidal signal generator 210. FIG. 4A provides an example of circuitry that may be used to implement phase accumulator 410. As shown in FIG. 4A, phase accumulator 410 includes a register 416 that stores a value representing an accumulated phase. Register 416 stores a value having N bits. The number of bits in register 416 is not critical to the invention and any suitable number of bits may be used. Regardless of the number of bits in register 416, the value stored in register 416 is interpreted as a phase value of a point in one cycle of a sine wave. The phase value stored in register 416 may represent the number of degrees in the sine wave divided by $2^N$, where N is the size of register 416. For each period of operation of phase accumulator 410, the stored value in register 416 is incremented by a phase increment stored in register 412.

Though not expressly shown, the value in phase increment register 412 may be programmed, such as by control circuitry 112 (FIG. 1). In the illustrated embodiment, the frequency of the output generated by a sinusoidal signal generator using a phase accumulator 410 may be programmed by programming the phase increment value stored in register 412.

Phase accumulator 410 includes an adder 414. For each period of operation of phase accumulator 410, the value previously stored in accumulated phase register 416 is incremented by the value stored in phase increment register 412. The output of adder 414 is then stored in accumulated phase register 416 as the new accumulated phase.

If the values at the input of adder 414 sum to a value that requires more bits to represent than can be stored in accumulated phase register 416, the most significant bits of the sum may be simply discarded. Discarding the most significant bits results in the value stored in accumulated phase register 416 increasing in the same way as using modular arithmetic to add the phase increment to the accumulated phase. Because the output of phase accumulator 410 is used to address points on one cycle of a sine wave, discarding the most significant bits of the sum results in values representing a phase beyond the end of that cycle to be converted to values beyond the beginning of the cycle by the same amount that the values exceed the end of the cycle. Thus, the circuit of FIG. 4A may be used to generate a series of phase values that repeats cyclically as desired. However, any suitable technique for generating a phase signal may be used.

FIG. 4B illustrates an embodiment of circuitry that may be used to implement predistortion circuit 460. Predistortion circuit 460 includes two look-up tables, I look-up table 462 and Q look-up table 464. Each of the look-up tables 462 and 464 may be implemented in computer memory or in any other suitable way. The values stored in each of the look-up tables 462 and 464 may be determined during a calibration routine. An example of a suitable calibration routine is described below. Briefly, the calibration routine determines in-phase and quadrature-phase correction values. These correction values are stored separately in I look-up table 462 and Q look-up table 464, respectively, When a signal to be predistorted is applied at the input of predistortion circuit 460, that signal is used to address I look-up table 462. The input signal is shifted approximately 90° in phase shifter 470 to produce quadrature signal, Q(t). Q(t) is used to address Q look-up table 464. For each sample of the input signal, an I correction value and a Q correction value are read from I look-up table 462 and Q look-up table 464, respectively. These correction factors are summed at adder 472. The sum of the I and Q correction factors is subtracted from the input signal at adder 474 to produce a predistorted signal at the output of predistortion circuit 460.

In sinusoidal signal generator 210 (FIG. 2A), output 222 of look-up table 220 can be represented as X(t), the desired output signal, plus a distortion amount, denoted in FIG. 4B as p(t). The function p(t) represents any error introduced because output 222 is not a pure sine wave. The error introduced in D/A converter 224 may be represented as c(t).

The coefficients stored in I look-up table 462 and Q look-up table 464 may collectively represent nonlinearity errors introduced as a result of the conversion in D/A 224 and elsewhere in sinusoidal signal generator 210. Accordingly, the output of adder 472 can be represented c(t)+p(t), representing the combination of errors. When this value is subtracted from the input in adder 474, the resulting output can be represented as X(t)−c(t). Thus, some of the output of predistortion circuitry 460 removes the errors introduced by sinusoidal signal generator 210 other than D/A 224 while simultaneously predistorting the value to be applied to D/A 224 by an amount that compensates for distortion that will be introduced when conversion is performed in D/A 224.

In the embodiment of FIG. 4B, phase shifter 470 may be any suitable phase shifter. An example of a suitable phase shifter is an $N^{th}$ order Hilbert filter. Using higher order filters results in a more accurate phase shift. However, the complexity of the circuitry required to implement a Hilbert filter increases as the order increases. For each order, the filter requires additional adders, multipliers and storage. In some embodiments, the number of circuit components in a Hilbert filter of an order that delivers a desired accuracy may make it undesirable to include a Hilbert filter or other phase shifter than can operate on a signal represented as a series of digital values in a sinusoidal signal generator.

FIG. 4C shows an alternative embodiment of a predistortion circuit 460' that does not use a phase shifter. Predistortion circuit 460' incorporates an I look-up table 462, a Q look-up table 464, an adder 472 and an adder 474 that may be in the same form as comparable components in predistortion circuit 460.

Predistortion circuit 460' differs from predistortion circuit 460 in that it receives as inputs an in-phase value I(t) and a quadrature-phase value Q(t). The values I(t) and Q(t) may be used directly as addresses to the I look-up table 462 and Q look-up table 464.

If an in-phase signal I(t) and a quadrature-phase signal Q(t) can be generated outside of predistortion circuit 460' more simply than using phase shifter 470, omitting phase shifter 470 results in a net simplification of a sinusoidal signal generator.

Figure 2B:
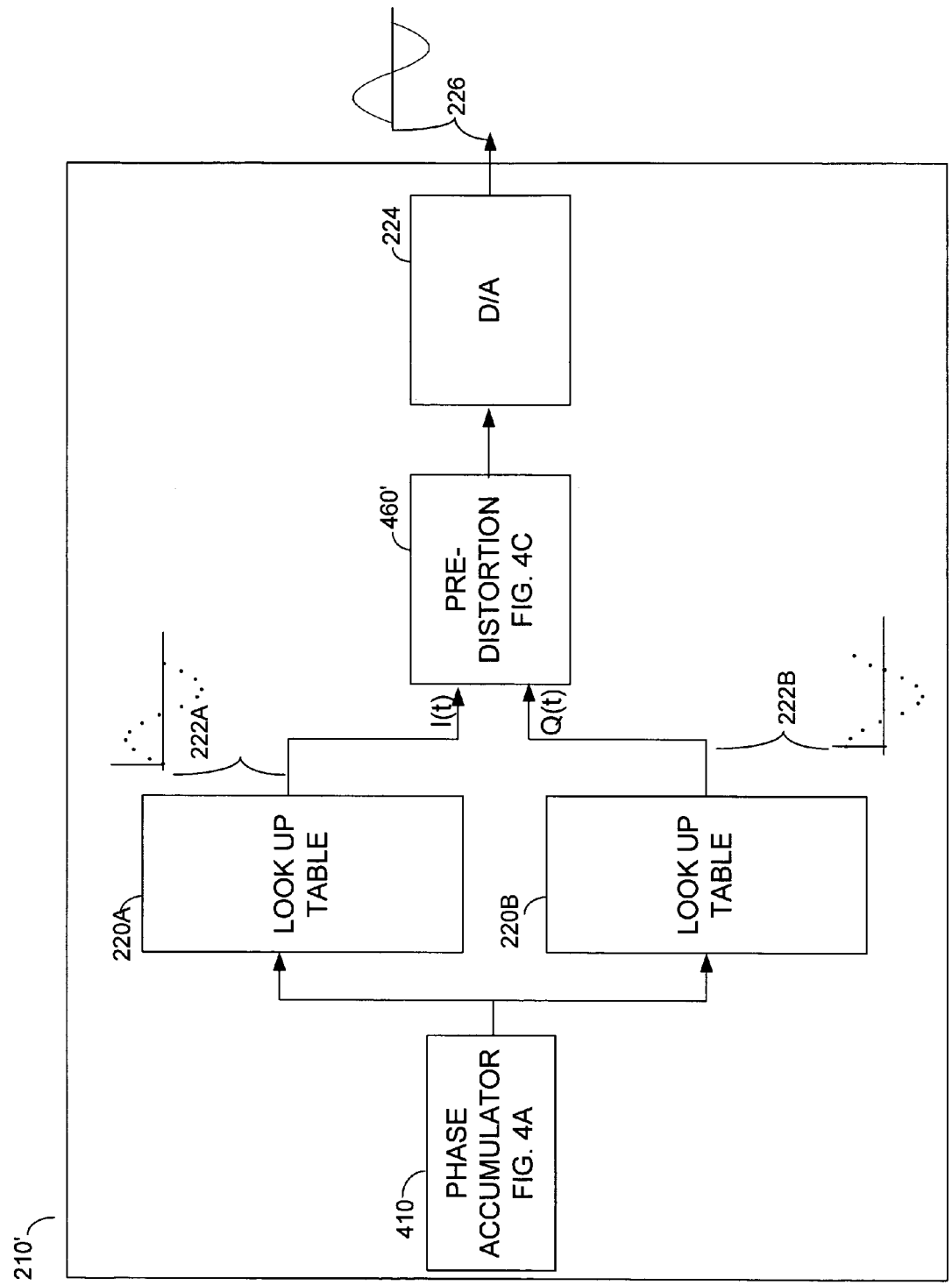
FIG. 2B is a block diagram of a sinusoidal signal generator.

FIG. 2B illustrates an embodiment of a sinusoidal signal generator 210' in which an in-phase signal I(t) and a quadrature-phase signal Q(t) can be generated outside of predistortion circuit 460' without using a phase shifter of the same complexity as phase shifter 470 (FIG. 4A).

In the embodiment illustrated in FIG. 2B, phase shifter 210' includes a phase accumulator 410 and D/A 224 as in sinusoidal signal generator 210 (FIG. 2A). However, sinusoidal signal generator 210' can provide an in-phase signal I(t) and a quadrature phase signal Q(t) as inputs to predistortion circuit 410' because it has two look-up tables 220A and 220B.

Look-up table 220A may store values representing points on a sine wave in the same way as look-up table 220 (FIG. 2A). Look-up table 220B also may store values representing points on a sine wave, though offset in phase. When phase accumulator 410 supplies an address, look-up table 220A outputs an in-phase value of a sine wave associated with that phase. For that same phase value, look-up table 220B may output a corresponding quadrature-phase value. The in-phase and quadrature-phase values may be applied directly to the I(t) and Q(t) inputs, respectively, of predistortion circuit 460'. Predistortion circuit 460' can therefore compensate for distortion at output 226 without use of a phase shifter.

Figure 3:
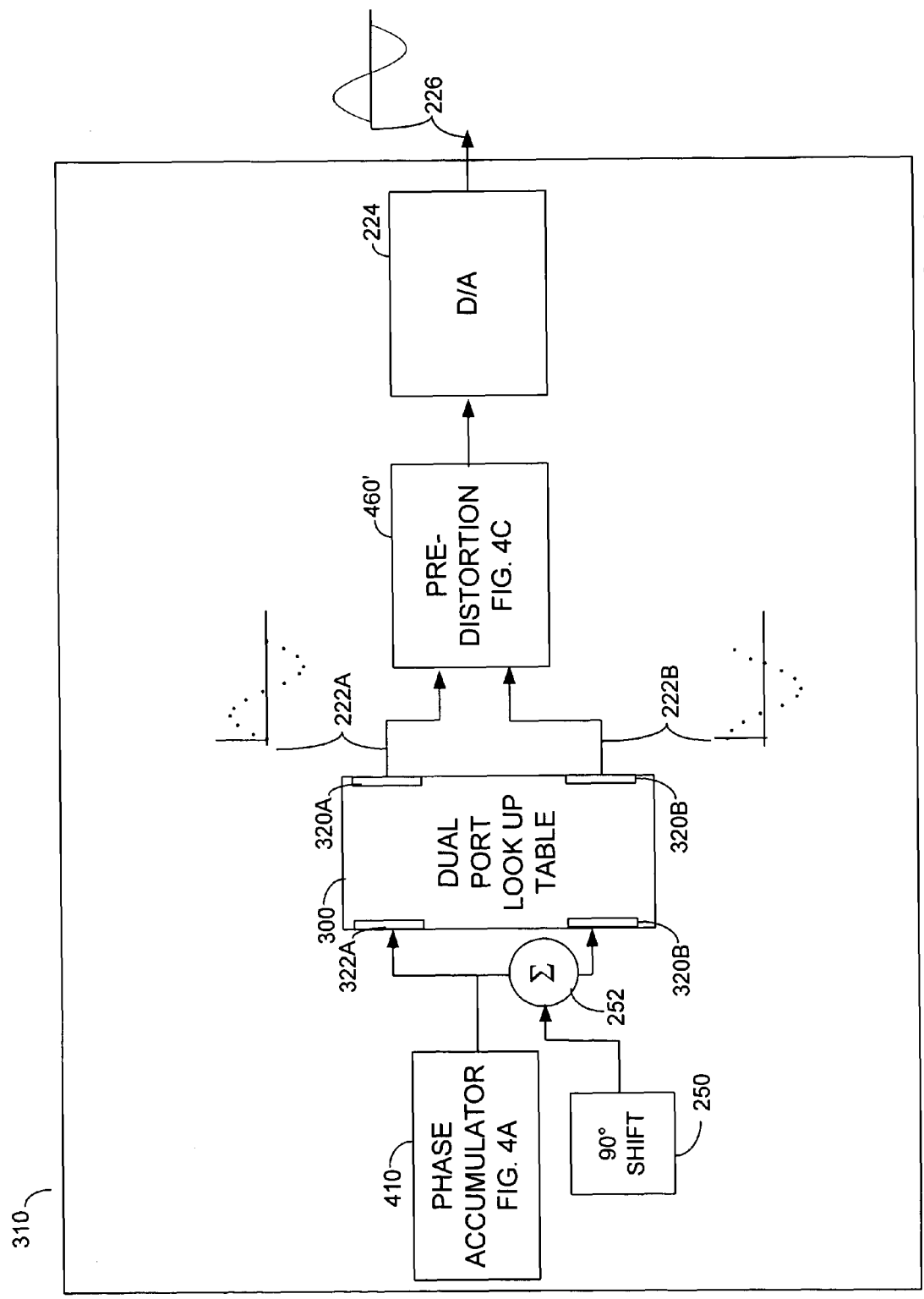
FIG. 3 is a block diagram of a sinusoidal signal generator according to an embodiment of the invention.

FIG. 3 shows an alternative embodiment of a sinusoidal signal generator 310 in which predistortion circuit 460' can compensate for distortion at output 226 without use of phase shifter. Sinusoidal signal generator 310 differs from sinusoidal signal generator 210' in that a single look-up table may be used in sinusoidal signal generator 310 to generate samples of a sine wave.

In sinusoidal signal generator 310, a single look-up table storing values representing a sine wave is accessed twice per period to obtain from the look-up table both an in-phase and a quadrature phase value. The second access is at an address in the look-up table that corresponds to a phase offset by 90° from the address of the first access.

In the embodiment of FIG. 3, a phase shift circuit is used to derive both addresses from a value output by phase accumulator 410. In the embodiment illustrated, the value output by phase accumulator 410 is used directly as the first address to look-up table 300. A second address is computed from the value output by phase accumulator 410 by adding a value representing 90° of phase.

Computation of a quadrature-phase address can be performed in any suitable circuitry. In the embodiment illustrated, adder 252 performs this computation. Adder 252 receives as one input the value output by phase accumulator 410. A second input to adder 252 is coupled to a shift circuit 250, which may be a register that stores a value corresponding to a 90° phase increment. However, in some embodiments, a value representing a 90° phase increment may be hardwired into the circuitry of adder 252. Adder 252, similar to adder 414 used in phase accumulator 410 (FIG. 4A), may sum the values applied to its inputs using modular arithmetic such that any sums representing a phase beyond the end of a cycle of a sine wave are mapped to an equivalent phase value within the cycle.

Though sinusoidal signal generator 310 includes a phase shifter, that phase shifter may be implemented using circuitry that is much simpler than is required to implement phase shifter 470 (FIG. 4B). For example, circuitry implementing adder 252 can be much smaller and less expensive to implement than the multiple multipliers and adders that would be required to implement a multi-order Hilbert filter that can act as phase shifter 470.

The in-phase and quadrature phase addresses can be used to obtain an in-phase and a quadrature-phase value from a single look-up table 300 in any suitable way. In the embodiment of FIG. 3, look-up table 310 is implemented as a multi-port look-up table, which allows both values to be read simultaneously from the look-up table. In other embodiments, it may be possible to achieve the same results by using time multiplexing to read both values from the look-up table. Time multiplexing may be appropriate when the look-up table can output values at a periodic rate that is at least twice as fast as the rate at which samples of a sine wave need to be applied to the input of D/A 224.

In sinusoidal signal generator 310, the look-up table 300 is implemented as a dual-port look-up table, which allows two values to be read from the memory simultaneously. As shown, look-up table 300 includes a first address input 322A and a second address input 322B. The value stored in look-up table 300 at an address corresponding to the value at address input 322A is provided at output 320A. Similarly, the value stored in look-up table 300 at an address corresponding to the value at address input 322B is provided at output 320B. In the pictured embodiment, dual port look-up table 300 may provide values at outputs 320A and 320B so that values for I(t) and Q(t) may be provided simultaneously to predistortion circuit 460'.

Dual port look-up table 300 may be implemented in any suitable way. In some embodiments, dual-port look up table 300 may be implemented in a dual port RAM or other similar semiconductor device. However, it is not a limitation on the invention that all circuitry implementing a dual-port look-up table be stored in a single semiconductor device. Combinations of device may be used to access an in-phase and a quadrature-phase value from a collection of memory cells. Alternatively, a dual-port look-up table may be implemented as a block of memory cells in an application specific integrated circuit, programmable logic device or other component that contains circuitry implementing other functionality that is part of a larger system.

Any suitable format may be used to store values in look-up table 300. Further, it is not necessary that values representing a full cycle of a sine wave be stored in look-up table 300. In some embodiments, the symmetry of a sine wave may be used to reduce the amount of data stored in look-up table 300.

FIGS. 5A . . . 5E illustrate how symmetry of a sine wave may be used to generate values for an entire cycle of a sine wave with only values for a quarter cycle of the sine wave. FIG. 5A illustrates a sine wave 510, which may be divided into four quadrants, $Q_1$, $Q_2$, $Q_3$ and $Q_4$. The values in quadrant $Q_2$ are the mirror image of those in $Q_1$. Values in quadrants $Q_3$ and $Q_4$ are the negative of those in quadrants $Q_1$ and $Q_2$. Accordingly, even if a look-up table stores only the values for one quadrant of a sine wave, values at any phase of the sine wave can be related to a value for the stored quadrant.

FIG. 5B illustrates a range 512, corresponding to quadrant $Q_1$, for which values of a sine wave may be stored in a look-up table. If the address input to the look-up table specifies a phase in range 512, the value of a sine wave at the specified phase can be determined by reading a value directly from the look-up table.

FIG. 5C illustrates how a value for a phase in range 514 may be determined even if the look-up table does not store a value corresponding to that phase. Range 514 is in quadrant $Q_2$. A point, such as 520, in range 514 has a value that is the same as at point 522. Point 522 is in quadrant $Q_1$, and, in the illustrated embodiment, a value for point 522 is stored in the look-up table.

FIG. 5C illustrates a relationship between points 520 to point 522 that may be used for any point in range 514 to determine a corresponding point in range 512 for which a value is stored in the look-up table. As can be seen, point 522 has a phase that is $P_2$ more than the phase that defines the boundary between $Q_1$ and $Q_2$. Point 520 has a phase $P'_2$ that is $P_2$ less than the phase that defines the boundary between $Q_1$ and $Q_2$. A corresponding point in range 512 may be identified for any point in range 514 by finding the point that is less than the $Q_1/Q_2$ quadrant boundary by the same amount that the point in range 614 is above the $Q_1/Q_2$ quadrant boundary.

FIG. 5D illustrates how a value for a phase in range 516 may be determined even if the look-up table does not store a value corresponding to that phase. Range 516 is in quadrant $Q_3$. A point, such as 530, in range 516 has a value that corresponds to the value at point 532. Point 532 is in quadrant $Q_1$, and, in the illustrated embodiment, a value for point 532 is stored in the look-up table.

As can be seen, point 532 has a phase $P_3$ that is the same as the amount that the phase of point 530 exceeds the $Q_2/Q_3$ quadrant boundary. However, the value of point 530 is the negative of the value for point 532. Thus, for any phase in quadrant $Q_3$, a value can be determined by finding the value for a corresponding point in $Q_1$ and negating that value.

FIG. 5E illustrates how a value for a phase in range 518 may be determined even if the look-up table does not store a value corresponding to that phase. Range 518 is in quadrant $Q_4$. A point, such as 540, in range 518 has a value that is the negative of the value at point 542. If the value at point 542 can be determined, the value at point 540 may be determined by negating that value.

Point 542 is in quadrant $Q_2$. In the illustrated embodiment, values for phases in quadrant $Q_2$ are not directly stored in the look-up table. However, as described above in connection with FIG. 5C, it is possible to derive the value for any point in quadrant $Q_2$ from values stored in the look-up table. The same approach may be used to derive a value when computing the value of point 542 in quadrant $Q_4$.

Thus, regardless of the quadrant in which a phase falls, the value at that phase of a sine wave may be determined from the values of one quadrant of a sine wave stored in a look-up table.

In a sine wave generator according to embodiments of the invention, circuitry may use the symmetry depicted in FIGS. 5A . . . 5E to compute a value for any phase, regardless of the quadrant in which the value falls. FIGS. 5B . . . 5E also indicate a simple approach that such circuitry may use to determine the quadrant in which a phase value falls. By determining the quadrant in which a phase value falls, a mapping, as depicted in one of FIGS. 5B . . . 5E, should be used to determine which value in the first quadrant to read from the look-up table and to translate that value into the desired value.

Each of FIGS. 5B . . . 5E pictures a digital representation of a phase value in one quadrant. FIG. 5B shows a digital phase value 550 representing a value in quadrant $Q_1$. The most significant bits (MSB) of digital phase value 550 are 00. All phase values in quadrant $Q_1$ have MSB of 00. Similarly, FIGS. 5C, 5D and 5E picture digital phase values 552, 554 and 556 representing values in quadrant $Q_2$, $Q_3$ and $Q_4$, respectively. Phase values in $Q_2$ have an MSB of 01. Phase values in $Q_3$ have an MSB of 10 and phase values in $Q_4$ have an MSB of 11. Thus, by examining the MSB of a digital phase value, the quadrant in which that value falls can be identified. Circuitry computing phase values from a look-up table storing only phase values in one quadrant can use the MSB of the phase value to identify the desired quadrant and determine the appropriate processing to derive the required value of a sine wave from the look-up table.

Figure 6:
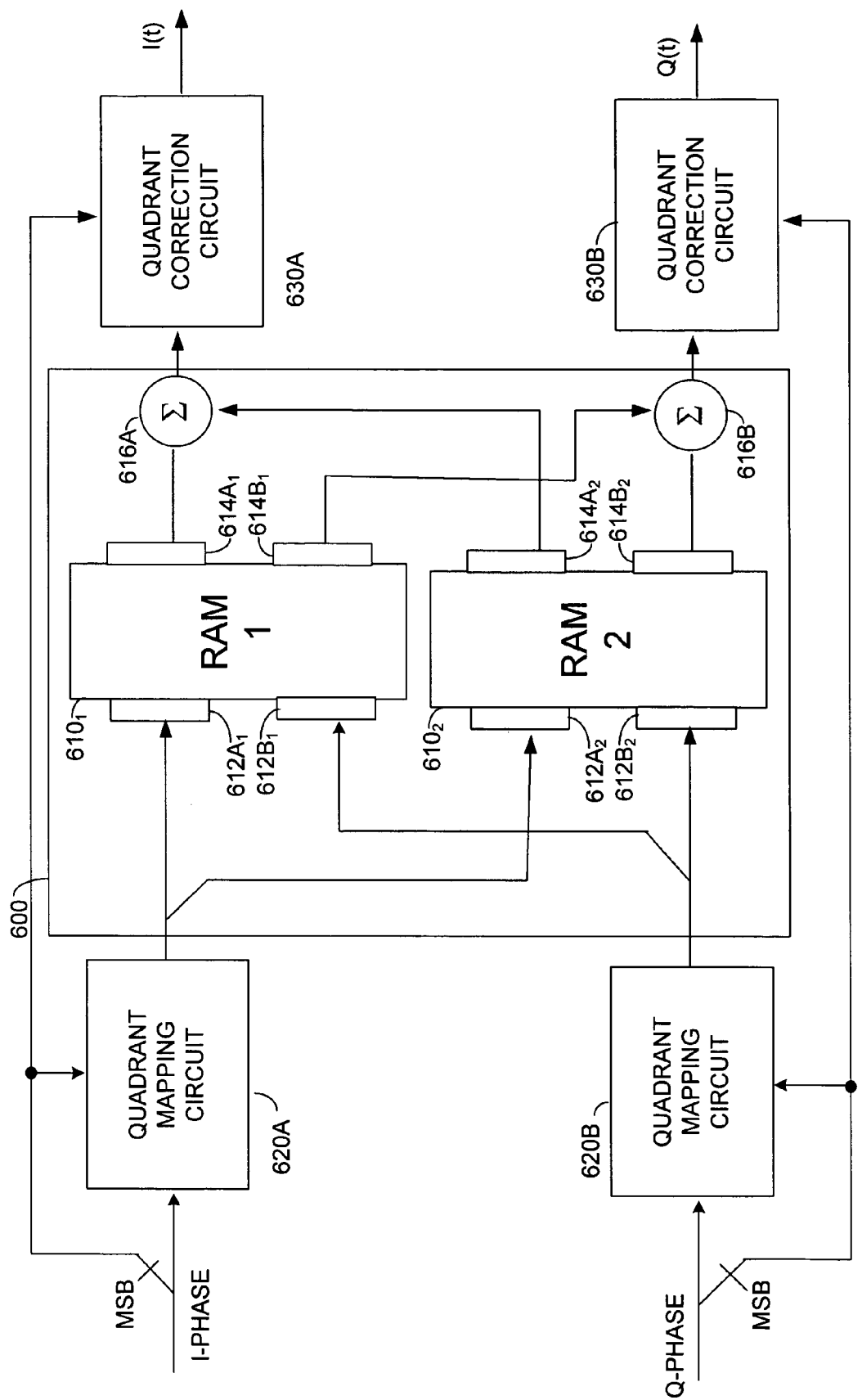
FIG. 6 is block diagram of circuitry generating an in-phase and a quadrature-phase components of a sinusoidal signal using a look-up table according to an alternative embodiment of the invention.

FIG. 6 illustrates a circuit that may be used to implement a circuit that computes a value for a phase of a sine wave using values output by a look-up table that stores values for only one quadrant of a sine wave.

FIG. 6 illustrates circuitry that may be used in connection with a dual-port look-up table 600. The circuit receives as inputs values I-PHASE and Q-PHASE, which act as address inputs to each port of the dual-port look-up table. The values I-PHASE and Q-PHASE may be values such as those applied to address inputs 322A and 322B of dual-port look-up table 300 (FIG. 3) or any other suitable values. Processing of the I-PHASE and Q-PHASE inputs may be the same, in each case producing an output value, I(t) and Q(t), respectively, representing the value of a sine wave at a phase corresponding to an input value.

For each input, the two most significant bits (MSB) of the inputs are separated from the rest of the input values. The two most significant bits of a phase value identify the quadrant in which that phase value falls. In the embodiment of FIG. 6, the MSB of I-PHASE is used as a control input to quadrant mapping circuit 620A and quadrant correction circuit 630A. The MSB of Q-PHASE is used as a control input to quadrant mapping circuit 620B and quadrant correction circuit 630B.

Quadrant mapping circuits 620A and 620B translate an input phase value into a phase value in the first quadrant according to the mappings illustrated in FIGS. 5B, 5C, 5D and 5E. The specific mapping used depends on the quadrant in which the input phase falls and can be determined from the MSB of the input value.

Once the appropriate phase value in the first quadrant is determined, that phase value is applied as an address input to look-up table 600. The value at that address is read from the look-up table. If further computation is required to implement a mapping as illustrated in FIGS. 5B, 5C, 5D and 5E, that correction is applied in quadrant correction circuit 630A or 630B. For example, processing in quadrant correction circuit 630A and 630B may include negating the values when the input phase indicates a value in quadrant $Q_3$ or $Q_4$.

Circuitry to construct quadrant mapping circuits 620A and 620B and quadrant correction circuit 630A or 630B may be constructed using known circuit design techniques, or in any other suitable way.

FIG. 6 illustrates as an example of a further variation that it is not necessary that a look-up table be implemented as a single memory. In the illustrated embodiment, two memories are used. As shown, memories $610_1$ and $610_2$ collectively store the look-up table. In the illustrated embodiment, each memory is a dual-port memory. Memory $610_1$ has a first port with an address input $612A_1$ and an output $614A_1$ and a second port with an address input $612B_1$ and an output $614B_1$. Similarly, memory $610_2$ has a first port with an address input $612A_2$ and an output $614A_2$ and a second port with an address input $612B_2$ and an output $614B_2$.

In the embodiment of FIG. 6, both memories $610_1$ and $610_2$ output a value in response to the I-PHASE and Q-PHASE inputs. The values are combined in adders 616A and 616B to output one value for an in-phase component and one value for the quadrature-phase component.

In the illustrated embodiments, the input phase value is split so that the lower order bits of the phase address memory $610_1$ and the higher order bits, without the MSB, address memory $610_2$. Memories $610_1$ and $610_2$ store values that collectively allow an approximation to a sine wave. Memory $610_1$ may store values of a sine wave spaced at intervals defined by the higher order bits of the phase values. Memory $610_2$ may store values representing an approximation of the change in the value of a sine wave in for an increase in phase by an amount represented by the lower order bits of the phase value. By adding the outputs of the two memories together, the result is an approximation of a value of a sine wave.

Other embodiments using two or more memories are possible. For example, one memory may store a coarse representation of a sine wave addressed by the higher order bits of the phase. The second memory may store an approximate rate of change of the sine wave corresponding to each coarse value. The approximate rate of change could be multiplied by the lower order bits and added to the coarse value read from the first memory to compute an amplitude value for the sine wave.

Though FIG. 6 shows that two memories are used to approximate a sine wave, the total number of memory locations required to store values for a point on a sine wave is less than if one memory were used to store values corresponding to each phase on the sine wave. The approximation may be less accurate, though errors introduced by the approximation may be provided by reduced or eliminated by compensation provided by predistortion circuit 460' or in any other suitable way.

Figure 7:
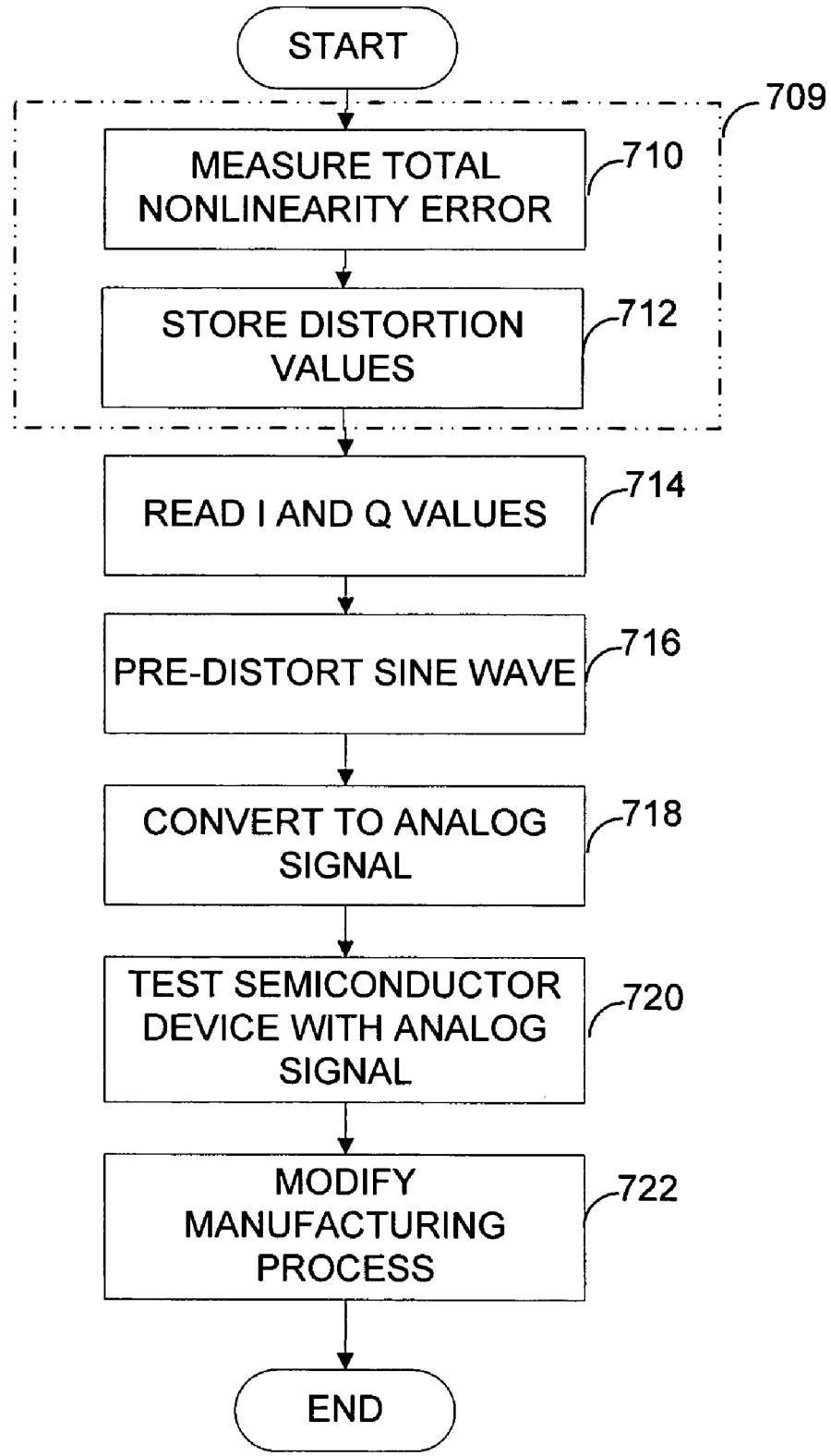
FIG. 7 is a flow chart of a process of manufacturing semiconductor devices according to an embodiment of the invention.

Regardless of the specific embodiment used to implement a sinusoidal signal generator, a sinusoidal signal generator according to an embodiment of the invention may be used in ATE to test semiconductor devices as part of their manufacture. Turning to FIG. 7, processing to test semiconductor devices using an automatic test system including one or more sinusoidal signal generators as described above is illustrated. The process of FIG. 7 begins at block 710, which begins a calibration routine 709, which includes blocks 710 and 712. During calibration routine 709, correction-factors stored in a predistortion circuit may be determined.

Calibration routine 709 may be performed at any suitable time in any suitable place. For example, calibration routine 709 may be performed as part of the manufacture of a test system and may be performed at a factory where the test system is manufactured. Alternatively, calibration may be performed when the test system is installed. As an example of a further alternative, calibration may be performed at a site where an automatic test system is used. For example, a calibration routine may be performed periodically, such as once each manufacturing shift.

At block 710, measurements are made from which a total non-linearity error of the sinusoidal signal generator can be determined. If the process of FIG. 7 is performed with a test system as shown in FIG. 1, measurements at block 710 may be made by coupling the output of analog channel 130, which includes a sinusoidal signal generator 132, to the input of analog channel 140. With this connection, the automatic test system 110 may obtain measurements of the actual signals generated when sine wave generator 134 is programmed to generate various sinusoidal signals. However, the precise mechanism by which a sinusoidal signal is measured is not a limitation of the invention and any suitable mechanism may be used. For example, separate test equipment used for calibration of automatic test equipment 110 may be connected to the output of any sinusoidal signal generator to make measurements of the actual outputs.

Regardless of how the measurements are made, those values may indicate the amount of distortion in the circuitry generating the sinusoidal signal. From these measurements, therefore, predistortion values that compensate for the total distortion may be computed and stored in the look-up tables within predistortion circuit 460'. An example of a process by which these values may be computed is provided below.

Regardless of how the stored distortion values are computed, processing then proceeds to block 714. At block 714, an in-phase and quadrature-phase values representing a sine wave are generated. In a sinusoidal signal generator in the form of FIG. 3, the processing at block 714 may include applying two sequences of phase values, offset by 90°, to the address inputs of a multi-port look-up table, such as look-up table 300 or look-up table 600.

Regardless of how in-phase and quadrature-phase values for a sine wave are generated at block 714, those values representing a sine wave approximation signal are predistorted. Processing at block 716 may provide predistortion to offset any errors introduced in other portions of the signal generation circuitry. In the example above, offset for errors associated with an analog-to-digital converter were described. However, the processing at block 716 may be used to offset errors introduced in any other component of a signal generator. In addition, processing at block 716 may compensate for any differences between the series of values representing a sine wave and an actual sine wave.

Once the series of values representing a sine wave is predistorted, it is converted to an analog signal at block 718. The sine wave may then be used at block 720 to test a semiconductor device. The analog sine wave may be used in any suitable way during testing of a semiconductor device. For example, the sine wave may be applied directly to a semiconductor device as a stimulus signal. Alternatively, the sine wave may be used to generate one or more clocks of a programmed frequency.

Regardless of how the analog signal is used in the testing process, results of the testing process are used at block 722 to modify the manufacturing process. In some instances, the manufacturing process is modified for a single semiconductor device. For example, a test result may be used to modify the process flow for a device, with devices that do not exhibit the expected response being culled and discarded while those that do exhibit the expected response being passed to subsequent steps in the manufacturing operation.

In other instances, test results may be used to "bin" semiconductor devices. In binning parts, those devices that perform as expected in all test cases may be binned as fully functioning devices. In contrast, devices that perform as expected in some, but not all, instances may be binned as partially functioning devices. Partially functioning devices may be packaged, marked or otherwise identified as devices with degraded performance if they can perform enough functions correctly to be useful. Devices with degraded performance may be sold at a lower price than fully functioning devices. As a specific example, a microprocessor chip may be designed to operate at clock frequencies of 4 GHz. During testing, a processor that performs as expected when clocked at 4 GHz may be packaged and sold as 4 GHz processors. However, a processor that does not perform as expected at 4 GHz, but does perform as expected at 2 GHz, may be packaged and sold at a reduced price as a 2 GHz processor.

Similar binning may be performed on other types of chips, such as semiconductor devices with onboard memory. For example, a device, may be designed with 512 KB of onboard memory. If, upon testing, the results indicate that only 256 KB of memory is operational, the device may be binned for sale as a part with 256 KB of onboard memory.

In other instances, the results of testing a device may be used to control physical modifications of the part. For example, many devices containing memory are constructed with spare memory cells. If, upon testing, some memory cells are determined to be faulty, the structure of the device may be altered to disconnect the faulty memory cells and connect spare memory cells in their place. Semiconductor devices may be altered using a laser or electrical signals that make or break interconnections within the device.

In other instances, test results are used to alter the manufacturing process in a statistical sense. Results of testing numerous devices may be aggregated to identify failure patterns that indicate a misalignment or other problem at a manufacturing step. Based on this analysis, manufacturing equipment used to manufacture semiconductor devices may be adjusted so that fewer devices are manufactured with defects.

Example of Computation of Predistortion Factors

The Harmonic distortion d(t) may be modeled using a general Fourier Series expansion as follows:

$$d(t) = \sum_{n=2}^{N} H_n \cdot \cos(n \cdot \omega \cdot t + \theta_n), \tag{1}$$

where t refers to time, and where $H_n$ and $\theta_n$ are the magnitude and phase of an $n^{th}$ harmonic as measured by Fast Fourier Transform (FFT) processing of a sampled and quantized calibration test signal.

Any signal, such as d(t) in equation (1), can be separated into an orthogonal superposition of an even function and an odd function, as follows:

$x(t) = x_E(t) + x_O(t),$ where $x_E(t) = \frac{1}{2} \cdot [x(t) + x(-t)]$ and $x_O(t) = \frac{1}{2} \cdot [x(t) - x(-t)]$.

The Fourier transform of this resulting test signal, x(t), can be written using the following superposition $X_1(\omega) = X_R(\omega) + j \cdot X_1(\omega)$ where $X_R(\omega)$ and $X_1(\omega)$ are the real and imaginary parts of $X(\omega)$. A useful property of real-valued signals, exploited in the linearity correction process described herein, is Hermitian symmetry, i.e., that $X_R(\omega)$ and $X_1(\omega)$ are equivalent to the Fourier Transform of the even parts and the odd parts, respectively, of x(t).

Expanding equation (1) above into even and odd terms using trigonometric identities yields the following general expression for harmonic distortion:

$$d(t) = \sum_{n=2}^{N} H_n \cdot [\cos(\theta_n) \cdot \cos(n \cdot \omega \cdot t) - \sin(\theta_n) \cdot \sin(n \cdot \omega \cdot t)] \quad (2)$$

Because static non-linearity produces errors that depend only on the current amplitude (e.g., sample value) of the fundamental calibration signal, it follows that the error function produced by this non-linearity must have the same symmetry as the fundamental calibration signal. Choosing an even function for the fundamental calibration signal, such as a zero phase cosine, ensures that static nonlinearity produces distortion that is reflected completely in the real part of the FFT. In this case, with purely static non-linearity and no dynamic component, the distorted signal is an even function, the FFT is completely real-valued, and equation (2) reduces to $$d(t) = \sum_{n=2}^{N} H_n \cdot \cos(\theta_n) \cdot \cos(n \cdot \omega \cdot t) \quad (3)$$

where $\theta_n = 0, \pi$ for all n.

If the fundamental calibration signal is even, any energy in the imaginary part of the FFT will be the result of an odd component in the harmonic distortion. Because this odd component to the harmonic has orthogonal symmetry to the fundamental calibration signal, the odd component must have originated from non-linearity with memory (i.e., dynamic non-linearity). Thus, dynamic non-linearity produces a component of the error signal (harmonic distortion) with orthogonal symmetry to the fundamental calibration signal, i.e., odd if the fundamental calibration signal is a cosine signal.

Static and dynamic non-linearity can be separated and measured independently using a combination of signal processing theory and Automatic Test Equipment (ATE) mixed-signal synchronization. If a calibrator uses a pattern to trigger an ATE capture instrument, such as analog capture instrument 140 (FIG. 1), at a peak of a sinusoid produced by an arbitrary waveform generator (AWG) source, such as analog instrument 130 (FIG. 1), then the calibrator can exploit the symmetry properties of the Fourier Transform to determine a distortion compensation function. In this case, the captured calibration test signal, y(t), has the form of a zero phase cosine with additive harmonic distortion d(t), such that:

$$y(t) = \cos(\omega \cdot t) + d(t).$$

The error signal (d(t)) produced by a combination of static and dynamic non-linearity can be generated digitally using an orthogonal basis of sine and cosine functions. One implementation that uses a Hilbert Filter to generate the quadrature component of this basis in conjunction with look-up table (LUT) memories is shown in FIG. 4B.

More specifically, because the harmonic distortion signal is periodic and real valued, the harmonic distortion signal can be represented by a general Fourier Series with an orthogonal basis of sine and cosine functions using equation (2). Thus, it is possible to digitally reconstruct the harmonic distortion signal using two look-up tables: an "I-LUT" addressed with fundamental signal and a parallel "Q-LUT" addressed by quadrature signal generated with a 90° phase shift Hilbert filter. The reconstructed harmonic distortion signal may then be used to compensate the channel non-linearity by predistorting the input to a digital-to-analog converter (DAC).

Referring to FIG. 4B, static non-linearity is compensated using an "in-phase" look-up table (I-LUT) 462 to implement a memory-less (meaning that the value of function depends on the current input) correction function that depends solely on a current value of x(t) (the signal being corrected). Dynamic non-linearity is compensated using a combination of a 90° phase shift, which is substantially constant over a broad frequency range, followed by a memory-less "quadrature" look-up table (Q-LUT) 464. As shown in FIG. 4B, the error correction data outputs of I-LUT 462 and Q-LUT 464 are combined using an adder 472 to produce the error, d(t), which is then subtracted from the input signal. FIG. B.

Each individual LUT (I-LUT 462 and Q-LUT 464) implements a polynomial function, $f_{LUT}$, of its address, which is defined as follows:

$$f_{LUT}(x) = \sum_{n=2}^{N} a_n \cdot x^n$$

This polynomial describes a memory-less non-linearity (The non-linearity is "memory-less" in the sense that the value of the function does not depend on prior values.). The $n^{th}$ term of this non-linearity produces an $n^{th}$ harmonic in response to a sinusoidal input, x(t).

Using a zero phase cosine signal for the fundamental calibration signal, correction data for storage in the I-LUT can be determined from the real part of the calibration signal FFT, and similarly correction data for storage in the Q-LUT can be determined from the imaginary part of the calibration signal FFT. Determining the I-LUT correction data includes mapping the harmonic distortion from a function of time to a function of amplitude, given that the I-LUT is addressed by a current sample value (amplitude). The input to the I-LUT is the primary data stream given by $x(t) = \cos(\omega_0 \cdot t)$. For a particular amplitude of x, the time at which the sample occurred (within a first cycle) is given by the following:

$$t = \omega_0^{-1} \cdot \cos^{-1}(x).$$

Substituting $\omega_0^{-1} \cdot \cos^{-1}(x)$ for the variable t in equation (3) above results in the following equation, which is used to determine the I-LUT correction data:

$$d_I(x) = \sum_{n=2}^{N} H_n \cdot \cos(\theta_n) \cdot \cos(n \cdot \cos^{-1}(x)) \quad (4)$$

The Q-LUT is addressed by a quadrature (approximately 90°) phase shifted version of x(t), namely:

$$x_q(t) = \cos(\omega_0 \cdot t - \pi/2) = \sin(\omega_0 \cdot t).$$

The time associated with a particular sample value at the input of the Q-LUT is defined by the following equation:

$$t = \omega_0^{-1} \cdot \sin^{-1}(x).$$

Substituting $\omega_0^{-1} \cdot \sin^{-1}(x)$ for t in equation (2) results in the following equation for determining the Q-LUT correction data:

$$d_q(x) = -\sum_{n=2}^{N} H_n \cdot \sin(\theta_n) \cdot \sin(n \cdot \sin^{-1}(x)). \quad (5)$$

Equations (4) and (5) provide closed-form solutions for determining correction data for use in correcting the first N harmonics produced by non-linearity in an ATE instrument channel. A process for determining table entries for an M-bit address LUT quantizes x ∈[−1,1] in $2^M$ values and determines corresponding error correction data using equations (4) and (5). It is noted that equations (4) and (5) are only valid if the harmonic amplitudes and phases result from FFT processing on a zero phase cosine fundamental calibration signal. Although patterned-controlled ATE signals can approximate a zero phase cosine fundamental calibration signal, in practice this can be time-consuming to achieve, and a residual phase error resulting from variability in delay through the instrument's analog signal path can limit signal correction. Allowing a non-zero phase for the fundamental calibration signal means that the calibration signal used to measure the harmonic amplitudes and phases has the form $$x(t) = \cos(\omega_0 \cdot t + \phi) \quad (6)$$

where ϕ is the arbitrary non-zero phase of the fundamental calibration signal. This more general approach is consistent with ATE capabilities and end-applications, where exact frequency ratios are achieved for coherency and typical FFT measurements are indifferent to the fundamental signal phase.

If ϕ is non-zero, the fundamental calibration signal contains both an even and odd component and, consequently, both static and dynamic non-linearity produce mixed-symmetry outputs. In order to use $H_n$ and $\theta_n$ to correctly load correction data in the look-up tables, it is necessary to create an orthogonal basis around the harmonic phase residual resulting from the dynamic linearity, i.e. $\theta_n$, with the contribution from ϕ removed. Recognizing that the $n^{th}$ term of the polynomial describing the memory-less, non-linear system produces an $n^{th}$ harmonic in response to x(t), and rotates the phase of x(t) by n·ϕ, the harmonic distortion in an instrument channel can be modeled as $$d(t) = \sum_{n=2}^{N} H_n \cdot \cos(n \cdot \omega_0 \cdot t + n \cdot \phi + \theta_n - n \cdot \phi).$$

Expanding the above equation onto an orthogonal basis of sine and cosine functions results in the following:

$$d(t) = \sum_{n=2}^{N} H_n \cdot [\cos(\theta_n - n \cdot \phi) \cdot \cos(n \cdot \omega_0 \cdot t + n \cdot \phi) - \sin(\theta_n - n \cdot \phi) \cdot \sin(n \cdot \omega_0 \cdot t + n \cdot \phi)].$$

If the channel non-linearity is purely static, then $\theta_n - n\phi = 0, \pi$ and the sine component above is zero. Thus, each cosine term of the above expression is "in-phase" with the fundamental signal, i.e., each harmonic term angle is rotated by n, which is the expected response due the $n^{th}$ order component to static non-linearity in the channel. In contrast, the sine term involves both rotation by n and a quadrature (i.e., approximately 90°) phase shift from the fundamental signal.

Thus, the I-LUT error correction data is determined from the in-phase distortion by mapping from the time domain to the amplitude domain at an input to the I-LUT, as follows:

$$t = \omega_0^{-1} \cdot (\cos^{-1} x - \phi).$$

Substituting $\omega_0^{-1} \cdot (\cos^{-1} x - \phi)$ for t in the "in-phase" term for d(t) provides the following closed-form equation for determining the I-LUT error correction data.

$$d_I(x) = \sum_{n=2}^{N} H_n \cdot \cos(\theta_n - n\phi) \cdot \cos(n \cdot \cos^{-1}(x)) \quad (7)$$

The relationship between a sample value and the time at which the sample occurred (in a first cycle) at the input to the Q-LUT is given by $$t = \omega_0^{-1} \cdot (\sin^{-1} x - \phi)$$

Substituting $\omega_0^{-1} \cdot (\sin^{-1} x - \phi)$ for t in the "quadrature" term for d(t) above results the following closed-form solution for determining the Q-LUT error correction data.

$$d_Q(x) = -\sum_{n=2}^{N} H_n \cdot \sin(\theta_n - n\phi) \cdot \sin(n \cdot \sin^{-1}(x)) \quad (8)$$

As described above, the process for determining table entries for an M-bit address LUT quantizes x ∈[−1,1] in $2^M$ values and determines the corresponding error correction data using equations (7) and (8). It is noted that equations (7) and (8) reduce to equations (4) and (5), respectively, when the phase offset, ϕ, is zero.

The following describes how I-LUT and Q-LUT error correction values are determined for all samples of a data converter used in exemplary ATE. More specifically, prior to use, the error correction values for the I-LUT and the Q-LUT are determined for a range of signals that pass through the source and capture channels of the ATE. These error correction values are then stored in the I-LUT and Q-LUT, and are used to correct subsequent signals passing through the source and capture channels. The following is used to determine the range of signals (codes of a data converter) over which to determine the error correction values that are to be stored in the I-LUT and Q-LUT.

If a continuous sine wave is randomly sampled with uniform probability over the range [0,2π], the probability that the sinusoid obtains the value x is given by $$p(x) = \frac{1}{\pi \cdot \sqrt{A^2 - x^2}},$$

where A is the amplitude of the sine wave. This distribution has the familiar "bathtub" curve shape with a minimum at mid-scale x=0 of $(\pi \cdot A)^{-1}$.

The probability that a code i is produced by a data converter that uniformly samples a sine wave on the interval [0,2π] and quantizes to N bits is given by integrating the above expression over the amplitude range for code i, with the following result:

$$P(i) = \frac{1}{\pi} \cdot \left[ \sin^{-1}\left(\frac{FSR \cdot (i - 2^{N-1})}{A \cdot 2^N}\right) - \sin^{-1}\left(\frac{FSR \cdot (i - 1 - 2^{N-1})}{A \cdot 2^N}\right) \right],$$

where FSR is the bipolar full-scale range of the quantizer and A is the sine wave amplitude. If the sine wave amplitude is matched to the full-scale range of the quantizer, with zero DC (Direct Current) offset, the least probable output code occurs at mid-scale $i=2^{N-1}$ with a probability of $1/(\pi \cdot 2^{N-1})$. Thus, the probability of occurrence of a mid-scale code decreases with the number of quantizer levels.

In order to provide a robust calibration, it is desirable to have the measurement process exercise every code of the converter. The expected number of code hits E(i) in a capture containing a number "Nsamples" of samples is given by $E(i) = P(i) \cdot Nsamples.$ Ensuring that the least probable mid-scale code is hit at least once implies that $Nsamples \geq \pi \cdot 2^{N-1}.$ Thus, calibration of a 16-bit converter using a fast radix-2 FFT process requires capture of at least 131,072 samples. While this constraint may be necessary to ensure that all converter codes are hit, it may not be sufficient, given that the sampling process can generate the same subset of codes on every cycle of the test waveform. In order to ensure that this does not occur, the integer number of cycles of the test waveform in a capture window may be mutually prime with respect to Nsamples.

The error correction data in the I-LUT and Q-LUT may be configured to correct for reflected, or aliased, harmonics in the instrument channel. Compensating for aliased frequency components includes correcting an aliased harmonic resulting from mixing of an $n^{th}$ component of a non-linearity with the clock used for sampling analog data. Compensating these aliased frequency components has the potential to improve the ATE's dynamic range when sourcing or capturing high frequency signals.

For an $N^{th}$ order correction, it is necessary to predict where, in the capture spectrum, each of the N harmonics will appear. Thus, for each harmonic $nf_0$ (where $f_0$ is the fundamental frequency), the following process is used to determine the frequency (FFT bin number) where an $N^{th}$ harmonic occurs, and the associated amplitude and phase to use in the LUT error correction data computations.

If the direct harmonic occurs in an odd Nyquist zone of the sampling clock defined as $$nf_0 \in \left[ (m-1) \cdot \frac{Fs}{2}, m \cdot \frac{Fs}{2} \right],$$

where m is odd and Fs is the Nyquist frequency, then the harmonic is deemed direct (i.e., not aliased). In this case, the frequency of the aliased harmonic is given by $$f_{nalias} = nf_0 \bmod \frac{Fs}{2}$$

where x mod y is the remainder of x/y. The magnitude and phase of this complex aliased frequency component, designated $H(f_{nalias})$, is used in equations (7) and (8) (or (4) and (5)) to determine the correction data. That is, for equations (7) and (8) (or (4) and (5)):

$H_n = |H(f_{nalias})|$ $\theta_n = \angle H(f_{nalias})$.

If the direct harmonic occurs in an even Nyquist zone of the sampling clock, then the harmonic is mirrored and the frequency of the aliased harmonic is defined as follows:

$$f_{nalias} = \frac{Fs}{2} - nf_0 \bmod \frac{Fs}{2}.$$

Given that the image of the even Nyquist zone is mirrored, the phase is conjugate and the harmonic amplitude and phase components of equations (7) and (8) (or (4) and (5)) are defined by $H_n = |H(f_{nalias})|$ $\theta_n = -\angle H(f_{nalias})$.

The negative phase of the aliased frequency component is used because the harmonic mixing with the clock produces a conjugate phase and not the channel non-linearity. Consequently, the conjugate of the alias spur phase is used to address the mixing effect.

The foregoing provides an example of a possible theory and approach for computing correction factors stored in a predistortion circuit as described above. Any other suitable approach may be used to determine correction values.

Having thus described several aspects of at least one embodiment of this invention, it is to be appreciated various alterations, modifications, and improvements will readily occur to those skilled in the art.

For example, the invention is described in connection with a sinusoidal signal generator in which sine waves are described. One of skill in the art will recognize that a sine wave
is an example of a sinusoidal signal and that the invention may be employed with a sinusoidal signal of any desired format and may be applied to other cyclical signals.

Also, embodiments of the invention are described using memory. Each memory could be implemented as separate semiconductor chip, such as a RAM, DRAM, SRAM, DDR RAM or other suitable memory chip. However, separate memory chips are not required to implement embodiments of the invention. Each memory may be implemented as a block of memory packaged in any suitable device. For example, some integrated circuit devices may include memory blocks in conjunction with digital logic. The memory blocks of those devices could be used to implement look-up tables while the digital logic could be used to implement logic controlling access to the memory blocks or for any other suitable purpose.

Further, the invention is illustrated by embodiments in which the in-phase and quadrature-phase components of a sinusoidal signal differ by 90° of phase. However, it is not necessary that in-phase and quadrature-phase components differ by exactly 90° of phase. Any two signals that differ by a non-zero phase will have in-phase and quadrature-phase components.

More generally, this invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Such alterations, modifications, and improvements are intended to be part of this disclosure, and are intended to be within the spirit and scope of the invention. Accordingly, the foregoing description and drawings are by way of example only.

What is claimed is:

1. Apparatus for generating a cyclical signal comprising:
   a) an accumulator having an output representing a phase;
   b) a memory comprising a first address input and a second address input and a first output and a second output, the memory storing values representing at least a portion of the cyclical signal, and the first address input being coupled to the output of the accumulator;
   c) a circuit having a first input and a second input and an output having a value based at least in part on a combination of values responsive to the first input and the second input, the first input and the second input being coupled to the first output and the second output, respectively, of the memory; and
   d) a digital to analog converter coupled to the output of the circuit.

2. The apparatus of claim 1, wherein the memory comprises a dual port memory.

3. The apparatus of claim 1, wherein the cyclical signal is an analog sinusoidal waveform and the memory stores digital values representing at least one quadrant of a sine wave.

4. The apparatus of claim 1, wherein the accumulator comprises a programmable phase increment register.

5. The apparatus of claim 1, further comprising a phase shifter coupled between the output of the accumulator and the second address input of the memory.

6. The apparatus of claim 5, wherein the phase shifter comprises a 90 degree phase shifter.

7. The apparatus of claim 1, wherein the circuit comprises at least one second memory addressed by the values at the first input and the second input of the circuit.

8. The apparatus of claim 1, wherein the circuit comprises a second memory having an address input and a third memory having an address input, and the first output of the memory is coupled to the address input of the second memory and the second output of the memory is coupled to the address input of the third memory.

9. A method of generating a cyclical signal, the method comprising:
   a) generating a series of addresses at periodic intervals;
   b) producing a shifted series of addresses from the series of addresses;
   c) reading a first series of values through a first port of a memory, the values in the first series being read from the memory at addresses in the series of addresses, and reading a second series of values through a second port of the memory, the values in the second series being read from the memory at addresses in the shifted series of addresses;
   d) obtaining a third series of values based on the first series of values and the second series of values;
   e) computing a fourth series of values by combing the third series of values with at least the first series of values; and
   f) applying the fourth series of values to a digital to analog converter.

10. The method of claim 9, wherein generating a series of addresses comprises generating a series of addresses at successive intervals that modularly increase by an amount each interval.

11. The method of claim 9, wherein each address of the series of addresses represents a phase of a sinusoidal signal and producing a shifted series comprises shifting the series by an amount approximating 90 degrees of phase.

12. The method of claim 9, wherein the memory is a dual port memory having a plurality of memory addresses storing values representative of at least a quadrant of a sinusoidal signal and reading a first series of values comprises reading a series of values representing the sinusoidal signal with a first phase and reading a second series of values comprises reading a series of values representing the sinusoidal signal with a second phase.

13. The method of claim 9, wherein obtaining a third series of values comprises reading from a first look up table addressed by the first series of values and reading from a second look up table addressed by the second series of values.

14. The method of claim 13, wherein obtaining a third series of values further comprises adding values read from the first look up table to values read from the second look up table.

15. An automatic test system, comprising a direct digital synthesis circuit adapted to generate a cyclical signal, the direct digital synthesis circuit comprising:
   a) an accumulator having an output;
   b) a memory comprising a first address input and a second address input and a first output and a second output, the first address input being coupled to the output of the accumulator, and the memory storing values representing at least a portion of the cyclical signal;
   c) a shifter coupled between the output of the accumulator and the second address input of the memory;
   d) a circuit having a first input and a second input coupled to the first output and the second output, respectively, of the memory, the circuit having an output based at least in part on a combination of values responsive to the first input and the second input; and
   e) a digital to analog converter coupled to the output of the circuit.

16. The automatic test system of claim 15, wherein the circuit comprises a first look up table addressed by the first input and a second look up table addressed by the second input, the first look up table and the second look up table storing correction factors that correct for nonlinearity in the digital to analog converter.

17. The automatic test system of claim 16, wherein the memory comprises a dual port memory.

18. The automatic test system of claim 16, wherein the direct digital synthesis circuit comprises a portion of an analog instrument adapted to produce a sinusoidal waveform.

19. The automatic test system of claim 18, wherein the accumulator is adapted to output a value increasing at periodic intervals by a programmable amount.

20. The automatic test system of claim 16, wherein the direct digital synthesis circuit comprises a portion of a timing generator in a digital channel.

21. The automatic test system of claim 20, wherein the timing generator is implemented in programmable logic device, the programmable logic device also implementing other circuit elements of the digital channel.

* * * * *